United States Patent Office 3,036,125
Patented May 22, 1962

3,036,125
PROCESS FOR PURIFYING LYSINE
Marshall F. Humphrey, Fanwood, N.J., and David A. Bray, Brooklyn, N.Y., assignors to Chas. Pfizer & Co., Inc., New York, N.Y., a corporation of Delaware
No Drawing. Filed June 2, 1959, Ser. No. 817,451
3 Claims. (Cl. 260—534)

This invention is concerned with a process for purifying lysine. More particularly, it is concerned with a process for purifying lysine in aqueous solution containing it together with ash impurities. It is also concerned with certain novel phenol salts of lysine which are useful therefor.

Lysine is an essential amino acid of commercial importance. The amino acid may be prepared by a number of methods described in the literature, for example, by fermentation methods as described in U.S. Patents 2,771,396 and 2,841,532; by chemical synthesis as described in U.S. Patents 2,586,154 and 2,536,360; or by hydrolysis of proteins as described in a number of literature articles. The biologically-active form of the essential amino acid is L-lysine, which is preferentially produced by the above mentioned fermentation methods. The chemical synthetic methods give rise to the racemic compound, DL-lysine, which may be resolved to the active form. The residual D-lysine may be racemized to DL-lysine by the methods described in U.S. Patents 2,586,154 and 2,536,360 and in copending application, Serial Number 736,663, filed on May 21, 1958 which describes the racemization of D-lysine to DL-lysine by treatment with the enzymes of certain microorganisms of the genera, Proteus and Escherichia.

One of the primary sources of difficulty in obtaining pure lysine is the separation of the amino acid from ash impurities which occur in aqueous solutions in which lysine is obtained by the various preparative procedures. Such ash impurities are soluble alkali metal salts such as sodium and potassium salts, which are introduced during the course of preparing and/or isolating the product. Illustrative of such aqueous solutions are resin column eluates, fermentation media and mother liquors from recrystallization. Of course, such ash impurities may be contained in a limited amount according to specification of the final lysine product. However, to obtain a product of high purity, the ash content should lie below 0.5% and preferably at or below 0.1%. The known methods of purifying lysine to free it of ash impurities generally result in a product containing an appreciable range of ash content, varying up to several percent. Additionally, the purification of lysine to remove ash by recrystallization and/or ion-exchange treatment can add appreciably to the total cost of the commercial production of lysine. The present process provides an economical and practical methdo of producing essentially ash-free lysine.

The process of the present invention is accomplished by merely contacting an aqueous solution of lysine together with ash impurities with a halophenol as hereinafter described. The resulting precipitate is the lysine salt of the halophenol. The present process is generally carried out at an initial pH of at least 8 but, preferably at an initial pH of from about 9 to about 10 since best results are obtained.

In the specific performance of the present process, the selected halophenol is added to the aqueous lysine-containing solution, the pH of which is at least 8. Production formation is almost instantaneous. The solution is agitated for a period of about 15 minutes and longer, if desired, to ensure complete precipitation. However, agitation is not essential but merely shortens precipitation time. It is obvious that the amount of halophenol employed in the present process should be at least equimolar with respect to the amount of lysine contained in the aqueous solution to effect precipitation of most of the lysine present. It is obvious to that less than an equimolar amount will result in precipitation of proportionally less lysine. Large excesses, say up to 1000% and higher, may also be used but provide no appreciable advantage. Usually, excesses of halophenol, up to 50% are found advantageous. The excess halophenol may be readily recovered from the reaction mixture. It may be removed by acidifying the filtrate from which the lysine salt has been separated. Alternatively, it may be removed by solvent extraction, if desired.

The halophenol may be added to the selected aqueous solution of lysine as the free phenol or in the form of an alkali metal salt, preferably the sodium salt which is most economical, although the potassium or lithium salt may also be used. Of course when the free phenol is added to the aqueous solution, the pH of the resulting solution can be adjusted to the above specified range by the addition of alkali, if needed. Alternatively, the free phenol may be dissolved in aqueous base and added to the aqueous lysine solution. A number of such bases may be employed. These include alkali metal oxides, hydroxides, carbonates and bicarbonates. Organic amines including primary, secondary and tertiary amines may also be employed for this purpose. Particularly effective is triethylamine since it is infinitely soluble in water.

The temperature at which the precipitation is carried out is not critical. A temperature of from 0° to 100° C. is entirely satisfactory. It is however most convenient to employ room temperature, that is between 20° and 30° C. as might be expected.

Since alkaline earth metal and ammonium ions form insoluble salts with the halophenol precipitating agents of this invention, it is preferred to remove these ions from the lysine solution before precipitation of the desired lysine salt, particularly, ammonium, magnesium, and calcium ions which are usually present as ash impurities with lysine in or recovered from fermentation broths. The removal of such ions from solution may be brought about by any of the usual, well known methods. For example, ammonium ion is removed by adjusting pH of the solution to the alkaline side and heating to drive off ammonia. Calcium and magnesium may be removed by precipitation, calcium as an insoluble salt, e.g. sulfate or oxalate, magnesium as magnesium ammonium phosphate ($MgNH_4PO_4$) or other obvious equivalents. These ions may also be removed by ion-exchange treatment, which may be coincidental with the recovery of lysine.

The precipitated lysine salt is then separated by conventional methods such as filtration, centrifugation and decantation, or, if desired, by solvent extraction.

The present process is found to be operable with aqueous lysine solutions containing as little as 1% by weight of the amino acid. However, it is usually preferred to operate with at least 5% solutions of the amino acid since higher efficiency is realized in so doing. It is genearally preferred to concentrate solutions of low lysine content to obtain solutions in the above described preferred range.

Lysine is obtained from the halophenol salt by conventional methods, known to those skilled in the art. For example, the salt is suspended in water and the mixture acidified with a mineral acid. The liberated phenol is then separated from the aqueous mixture by filtration and/or solvent extraction. Solvents suitable for this purpose are well known, e.g. methyl isobutylketone, benzylalcohol, chloroform, benzene, toluene. Of course, the recovered halophenol may then be used again in the present process. Lysine is then recovered as the mineral acid salt, e.g. the hydrochloride, sulfate, phosphate, etc. from the aqueous phase by concentration. The amino acid product is found to be essentially free of ash impurities.

An alternative procedure for obtaining lysine by the process of this invention involves counter current distribution techniques, based on the solubility of the lysine salt of the selected halophenol in organic solvents. This alternate procedure is particularly well suited for large scale production since it may be used as a continuous process. Adhering to the process conditions as previously mentioned, the halophenol is dissolved in a suitable water-immiscible organic solvent and the resultant solution used to extract lysine from its aqueous solution in the form of the lysine halophenylate. The organic phase is then water washed and finally contacted with aqueous mineral acid solution which extracts out lysine in the form of its mineral acid salt. Organic solvents suitable for dissolving lysine halophenylates may be determined by a minimum of laboratory experimentation. Illustrative of such solvents are water-immiscible ketones, e.g. methyl isobutyl ketone, benzylalcohol, liquid hydrocarbons both aliphatic and aromatic, e.g. benzene, toluene, hexane, octane, etc.; chloroform and other such solvents.

The novel compounds of this invention are lysine mono(halophenylates) in which the halophenol is selected from the group represented by the formula:

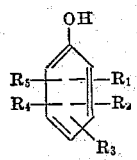

wherein $R_1$, $R_2$ and $R_3$ are halogen; $R_4$ is selected from the group consisting of hydrogen and halogen; and $R_5$ is selected from the group consisting of hydrogen, halogen and lower alkyl.

Illustrative of the phenols contemplated by the present process are the following: pentachlorophenol; pentabromophenol; pentaiodophenol; 3,5,6-trifluorophenol; 2,4.5-trichlorphenol; 2,4,5-tribromophenol; 3,5,6-trichloro-o-cresol; 2,3,6-tribromo-p-cresol; 2,4,6-trichlorophenol; 3,5,6-tribromo-2-ethylphenol; 2,3,6-triiodo-4-propylphenol; 3,4,5,6-tetrabromo-o-cresol and the like. Of particular value are the pentahalophenols which give best results.

It is indeed surprising that lysine may be recovered from aqueous solution by precipitation methods as herein described. It is well known that lysine salts have a high water solubility which would not permit their use in the isolation of lysine by precipitation procedures in commercial manufacture of the amino acid. Even the picrate salt of lysine is found to be of such high water solubility that its use in such isolation of lysine would not be practical. The present new salts, however, provide a practical and economical means of isolating and purifying lysine for commercial production of this important essential amino acid.

The following examples are given by way of illustration and are not to be construed as limitations of this invention many variations of which are possible without departing from the scope and spirit thereof.

EXAMPLE I

*Lysine Pentachlorophenylate*

A resin column eluate is prepared by passing a filtered fermentation broth containing lysine (prepared by the method of Casida, described in U.S. Patent 2,771,396) over a sulfonic acid resin column, followed by eluting the column with 5% aqueous ammonia and stripping ammonia from the eluate. The pH of the eluate is about 10. To 50 ml. of this eluate, containing 5 g. of lysine, is added 11 g. of pentachlorphenol and the mixture stirred for 15 minutes to ensure complete precipitation. The product after filtration, washing and drying, weighs 14.7 g., M. 239° C. (d).

EXAMPLE II

A slurry of 11.4 g. of the product of Example I in 30 ml. of water is treated with concentrated hydrochloric acid to pH=4.7. The mixture is stirred and filtered and the cake washed with water. The combined washings and filtrate are then concentrated to 10 ml. and 3 volumes of methanol added to precipitate out 2.5 g. of lysine hydrochloride. The product is found to be free of ash.

EXAMPLE III

A filtered fermentation broth, as described in Example I is freed of calcium magnesium and ammonium ion. The broth is then concentrated to a volume where the lysine content is about 10% by weight based on the total. The pH of the solution is 9.6.

To 50 ml. of this solution is added 11.85 g. of pentachlorophenol and the pH dropped to 7.5. Precipitation begins almost instantly on stirring and the resulting precipitate is then filtered.

Decomposition of the product by the method of Example I gives a 50% yield of lysine based on the original broth potency of the amino acid.

The procedure of this example is repeated with 2,4,5-trichlorophenol and pentabromophenol with equivalent results.

EXAMPLE IV

The procedure of Example III is repeated with a filtered fermentation broth prepared by the method described in copending application, Serial No. 736,663, filed May 21, 1958, with comparable results.

EXAMPLE V

The procedure of the above examples is repeated employing corresponding halophenols to prepare the following:

Lysine pentabromophenylate
Lysine 2,4,5-trichlorophenylate
Lysine 2,4,5-tribromophenylate
Lysine 3,5,6-trichloro-o-cresylate
Lysine 2,3,6-tribromo-p-cresylate
Lysine 2,4,6-trichlorphenylate
Lysine 3,5,6-tribromo-2-ethylphenol
Lysine 2,3,6-triiodo-4-propylphenol
Lysine 3,4,5,6-tetrabromo-o-cresol Each of these salts yields essentially ash-free lysine on decomposition with aqueous mineral acid as previously described.

What is claimed is:
1. A mono(halophenol)salt of lysine in which said halophenol is selected from the group represented by the formula:

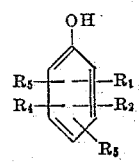

wherein $R_1$, $R_2$ and $R_3$ are the same and are selected from the group consisting of chlorine, bromine, iodine; $R_4$ is selected from the group consisting of $R_1$ and hydrogen; and $R_5$ is selected from the group consisting of $R_1$, hydrogen, and lower alkyl.

2. Lysine pentachlorophenylate.
3. Lysine pentabromophenylate.

References Cited in the file of this patent

UNITED STATES PATENTS 1,942,838 Semon _____ Jan. 9, 1934
1,968,913 Semon _____ Aug. 7, 1934